United States Patent
Rolf et al.

(10) Patent No.: US 9,983,016 B2
(45) Date of Patent: May 29, 2018

(54) PREDICTING SHORT TERM TRAVEL BEHAVIOR WITH UNKNOWN DESTINATION

(71) Applicant: HERE Global B.V., Eindhoven (NL)

(72) Inventors: Daniel Rolf, Berlin (DE); Raul Cajias, Berlin (DE)

(73) Assignee: HERE Global B.V., Eindhoven (NL)

( * ) Notice: Subject to any disclaimer, the term of this patent is extended or adjusted under 35 U.S.C. 154(b) by 78 days.

(21) Appl. No.: 15/070,480

(22) Filed: Mar. 15, 2016

(65) Prior Publication Data

US 2017/0268894 A1    Sep. 21, 2017

(51) Int. Cl.
*G01C 21/34* (2006.01)
*G01C 21/36* (2006.01)

(52) U.S. Cl.
CPC ......... *G01C 21/3484* (2013.01); *G01C 21/34* (2013.01); *G01C 21/3461* (2013.01); *G01C 21/3492* (2013.01); *G01C 21/36* (2013.01)

(58) Field of Classification Search
CPC ......... G01C 21/30; G01C 21/34; G01C 21/36
USPC ................. 701/410, 411, 423, 426, 532, 533
See application file for complete search history.

(56) References Cited

U.S. PATENT DOCUMENTS

| | | | | |
|---|---|---|---|---|
| 8,478,642 B2* | 7/2013 | Dey | ................... | G01C 21/3484 705/14.4 |
| 8,538,686 B2* | 9/2013 | Gruen | ................ | G01C 21/3617 190/102 |
| 8,548,734 B2* | 10/2013 | Barbeau | ............. | G01C 21/3617 701/410 |
| 9,141,909 B2* | 9/2015 | Hisano | .................. | B60W 40/06 |
| 2010/0010733 A1* | 1/2010 | Krumm | .............. | G01C 21/3484 701/533 |
| 2011/0172904 A1* | 7/2011 | Dayaratne | .......... | G01C 21/3484 701/533 |
| 2011/0282571 A1* | 11/2011 | Krumm | .............. | G01C 21/3617 701/532 |
| 2015/0134304 A1* | 5/2015 | Guiver | ..................... | G06N 7/00 703/2 |
| 2015/0253144 A1* | 9/2015 | Rau | ..................... | G01C 21/3415 705/348 |

OTHER PUBLICATIONS

Krumm, John, "Real Time Destination Prediction Based on Efficient Routes", *Microsoft Research*, 2006, 6 pages, Paper No. 2006-01-0811, SAE International, U.S.A.

(Continued)

*Primary Examiner* — Thomas G Black
*Assistant Examiner* — Wae L Louie
(74) *Attorney, Agent, or Firm* — Alston & Bird LLP

(57) ABSTRACT

Methods, apparatus, systems, and computer program products for predicting short term travel behavior of a user without knowing the user's destination. In one embodiment, a method is provided. The method comprises receiving historical location information for a vehicle and querying a set of indexed partial routes. A partial route of the set of indexed partial routes has a compiled quantity assigned thereto. The method further comprises reducing the set of indexed partial routes to a set of candidate partial routes based at least in part on the historical location information and identifying a most likely partial route from the set of candidate partial routes based at least in part on the compiled quantity associated with each of the candidate partial routes.

20 Claims, 9 Drawing Sheets

(56) References Cited

OTHER PUBLICATIONS

Krumm, John, "Where Will They Turn: Predicting Turn Proportions at Intersections", *Microsoft Research*, Oct. 7, 2010, 13 pages, U.S.A.

Krumm, John, et al., "Predestination: Inferring Destinations from Partial Trajectories", Proceedings of The Eighth International Conference on Ubiquitous Computing, Sep. 17-21, 2006, 19 pages, USA.

Simmons, Reid, et al., "Learning to Predict Driver Route and Destination Intent", 6 pages, retrieved from <http://www.cs.cmu.edu/~brettb/papers/06itsc-driver-intent.pdf> on Sep. 20, 2016.

\* cited by examiner

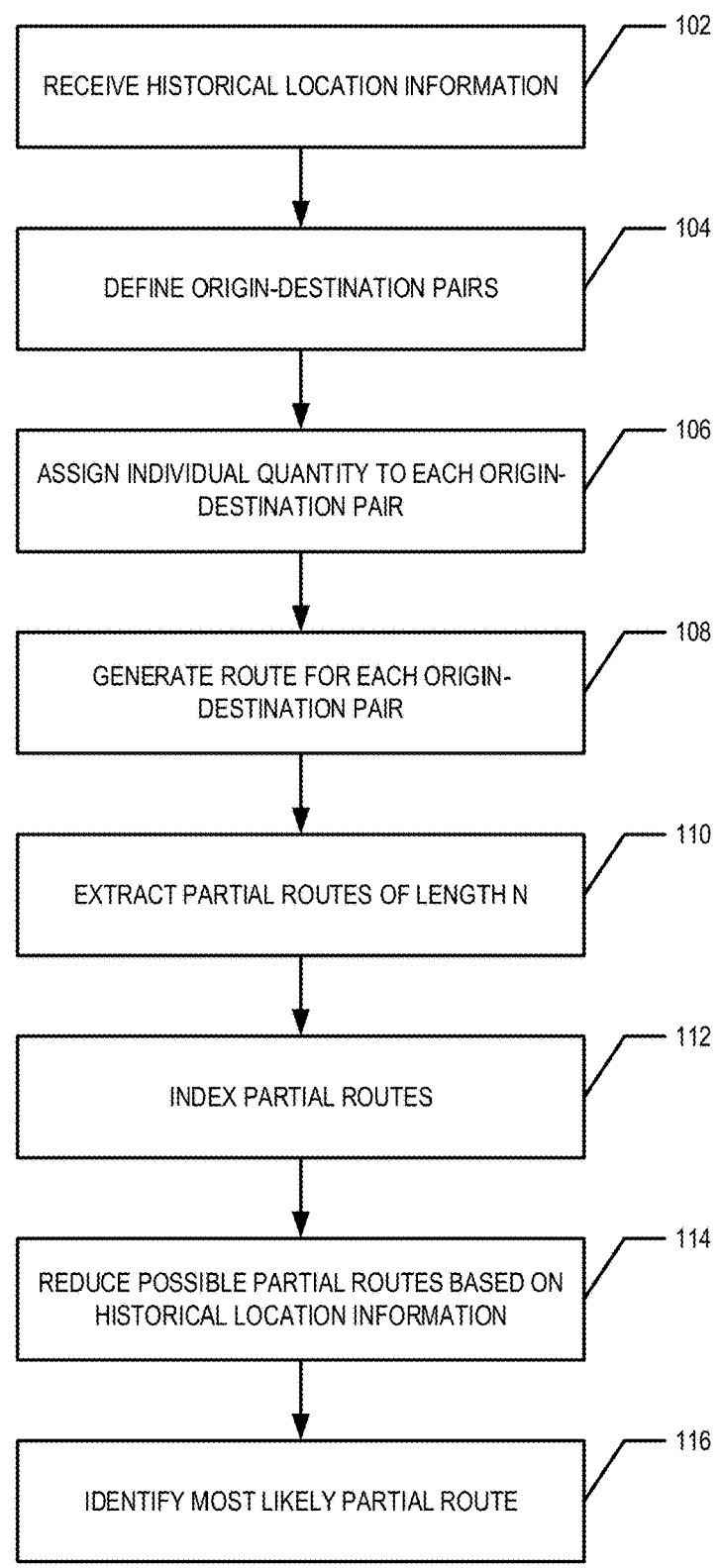

PREDICTING SHORT TERM TRAVEL BEHAVIOR WITH UNKNOWN DESTINATION

TECHNOLOGICAL FIELD

Example embodiments relate generally to predicting a route that a user will travel. In particular, example embodiments generally relate to predicting a route a user will travel without knowing the user's destination.

BACKGROUND

In car navigation systems can provide users with warnings regarding upcoming hazards and traffic along the user's travel path. However, if a user does not provide a destination that the user is traveling to, determining the travel path of the user can be quite difficult. Without knowing the route the user is following, the in car navigation system cannot provide appropriate warnings regarding upcoming hazards and/or traffic.

Additionally, methods for simulating traffic patterns generally depend on probe data. However, there are areas, even within mature markets, where insufficient probe data is available. For example, there may be areas and/or time where the number of probes providing probe data is small and/or where the GPS coverage is insufficient to provide probe data. The insufficient probe data makes traffic simulation difficult and/or reduces the usefulness of traffic simulation models.

BRIEF SUMMARY

Methods, apparatus and computer program products are provided in accordance with an example embodiment in order to predict the short term travel behavior of a user based on historical location information for the user. In example embodiments, historical location information for a vehicle is received. A set of indexed partial routes is queried. A partial route of the set of indexed partial routes has a compiled quantity assigned thereto. The set of indexed partial routes is reduced to a set of candidate partial routes based at least in part on the historical location information. A most likely partial route is identified from the set of candidate partial routes based at least in part on the compiled quantity associated with each of the candidate partial routes. In an example embodiment, the set of indexed partial routes is built by identifying a plurality of origin-destination pairs; assigning an individual quantity to an origin-destination pair of the plurality of origin-destination pairs; and determining a set of routes. Each route in the set of routes is a route from an origin to a destination of one of the plurality of origin-destination pairs. Building the set of indexed partial routes may further comprise extracting a set of partial routes of a length N from the set of routes and assigning the compiled quantity to a partial route of the set of partial routes based at least in part on the individual quantity assigned to one of the plurality of origin-destination pairs, wherein the route from the origin to the destination of the origin-destination pair comprises the partial route.

In accordance with an example embodiment, a method is provided. The method comprises receiving historical location information for a vehicle and querying a set of indexed partial routes. A partial route of the set of indexed partial routes has a compiled quantity assigned thereto. The method further comprises reducing the set of indexed partial routes to a set of candidate partial routes based at least in part on the historical location information and identifying a most likely partial route from the set of candidate partial routes based at least in part on the compiled quantity associated with each of the candidate partial routes.

In an example embodiment, the set of indexed partial routes is built by at least identifying a plurality of origin-destination pairs; assigning an individual quantity to an origin-destination pair of the plurality of origin-destination pairs; and determining a set of routes. Each route of the set of routes is a route from an origin to a destination of one of the plurality of origin-destination pairs. Building the set of indexed partial routes may further comprise extracting a set of partial routes of a length N from the set of routes and assigning the compiled quantity to a partial route of the set of partial routes based at least in part on the individual quantity assigned to one of the plurality of origin-destination pairs, wherein the route from the origin to the destination of the origin-destination pair comprises the partial route. In an example embodiment, the individual quantity is not based on probe data. In an example embodiment, the individual quantity assigned to an origin-destination pair is inversely correlated to the distance between the origin and the destination. In an example embodiment, the compiled quantity for the partial route is the sum of the individual quantities assigned to each origin-destination pair for which the route from the origin to the destination comprises the partial route. In an example embodiment, the length N is a predetermined distance or N intersections. In an example embodiment, the individual quantity indicates the probability that the user is traveling from the corresponding origin to the corresponding destination and wherein the compiled quantity indicates the probability that user is traveling along the partial route. In an example embodiment, the route corresponding to an origin-destination pair is the shortest route from the origin to the destination, the fastest route from the origin to the destination, or both.

In an example embodiment, the historical location information is determined by a location sensor onboard a vehicle and indicates the current location of the vehicle and a travel path of the vehicle to get to the current location. In an example embodiment, the travel path comprises a path the vehicle has traveled for predetermined distance, information regarding the past n intersections the vehicle has traveled through, or both.

In an example embodiment, the compiled quantity assigned to at least one of the partial routes is determined based at least in part on external information. For example, the external information may be based at least in part on current traffic conditions, current road conditions, traffic simulations, and/or a combination thereof.

In accordance with an example embodiment, an apparatus is provided. In an example embodiment, the apparatus comprises at least one processor and at least one memory storing computer program code. The at least one memory and the computer program code configured to, with the processor, cause the apparatus to at least receive historical location information for a vehicle; query a set of indexed partial routes; reduce the set of indexed partial routes to a set of candidate partial routes based at least in part on the historical location information; and identify a most likely partial route from the set of candidate partial routes based at least in part on the compiled quantity associated with each of the candidate partial routes. A partial route of the set of indexed partial routes has a compiled quantity assigned thereto.

In an example embodiment, to build the set of indexed partial routes, the at least one memory and the computer program code are further configured to, with the processor, cause the apparatus to at least identify a plurality of origin-destination pairs; assign an individual quantity to an origin-destination pair of the plurality of origin-destination pairs; determine a set of routes, each route of the set of routes being a route from an origin to a destination of one of the plurality of origin-destination pairs; extract a set of partial routes of a length N from the set of routes; and assign the compiled quantity to a partial route of the set of partial routes based at least in part on the individual quantity assigned to one of the plurality of origin-destination pairs, wherein the route from the origin to the destination of the origin-destination pair comprises the partial route. In an example embodiments, the individual quantity assigned to an origin-destination pair is inversely correlated to the distance between the origin and the destination. In an example embodiment, the compiled quantity for the partial route is the sum of the individual quantities assigned to each origin-destination pair for which the route from the origin to the destination comprises the partial route. In an example embodiment, the configurable length is a predetermined distance or a predetermined number of intersections. In an example embodiment, the individual quantity indicates the probability that the user is traveling from the corresponding origin to the corresponding destination and wherein the compiled quantity indicates the probability that user is traveling along the partial route. In an example embodiment, the route corresponding to an origin-destination pair is the shortest route from the origin to the destination, the fastest route from the origin to the destination, or both.

In an example embodiment the historical location information is determined by a location sensor onboard a vehicle and indicates the current location of the vehicle and a travel path of the vehicle to get to the current location and wherein the travel path comprises a path the vehicle has traveled for predetermined distance, information regarding the past n intersections the vehicle has traveled through, or both.

In an example embodiment, the compiled quantity assigned to at least one of the partial routes is determined based at least in part on external information. For example, the external information may be based at least in part on current traffic conditions, current road conditions, traffic simulations, and/or a combination thereof.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to receive historical location information for a vehicle; query a set of indexed partial routes; reduce the set of indexed partial routes to a set of candidate partial routes based at least in part on the historical location information; and identify a most likely partial route from the set of candidate partial routes based at least in part on the compiled quantity associated with each of the candidate partial routes. A partial route of the set of indexed partial routes has a compiled quantity assigned thereto.

In an example embodiment, to build the set of indexed partial routes, the computer-executable program code instructions comprise program code instructions configured to identify a plurality of origin-destination pairs; assign an individual quantity to an origin-destination pair of the plurality of origin-destination pairs, wherein the individual quantity assigned to an origin-destination pair is inversely correlated to the distance between the origin and the destination; determine a set of routes, each route of the set of routes being a route from an origin to a destination of one of the plurality of origin-destination pairs; extract a set of partial routes of a length N from the set of routes; and assign the compiled quantity to a partial route of the set of partial routes based at least in part on the individual quantity assigned to one of the plurality of origin-destination pairs, wherein the route from the origin to the destination of the origin-destination pair comprises the partial route.

In accordance with yet another example embodiment of the present invention, an apparatus is provided. The apparatus comprises means for receiving historical location information for a vehicle. The apparatus further comprises querying a set of indexed partial routes. A partial route of the set of indexed partial routes has a compiled quantity assigned thereto. The apparatus further comprises means for reducing the set of indexed partial routes to a set of candidate partial routes based at least in part on the historical location information. Additionally, the apparatus comprises means for identifying a most likely partial route from the set of candidate partial routes based at least in part on the compiled quantity associated with each of the candidate partial routes.

BRIEF DESCRIPTION OF THE DRAWINGS

Figure 1:
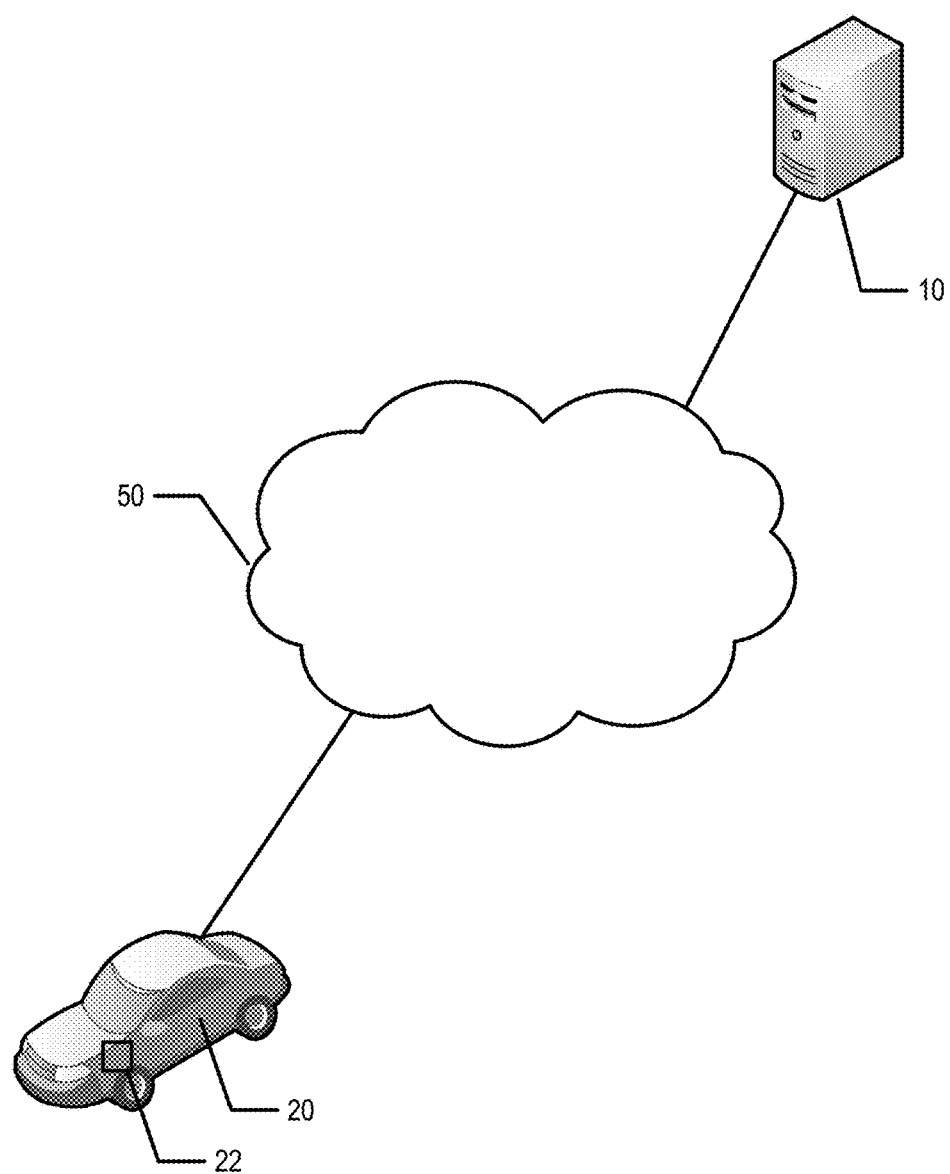
Figure 3A:
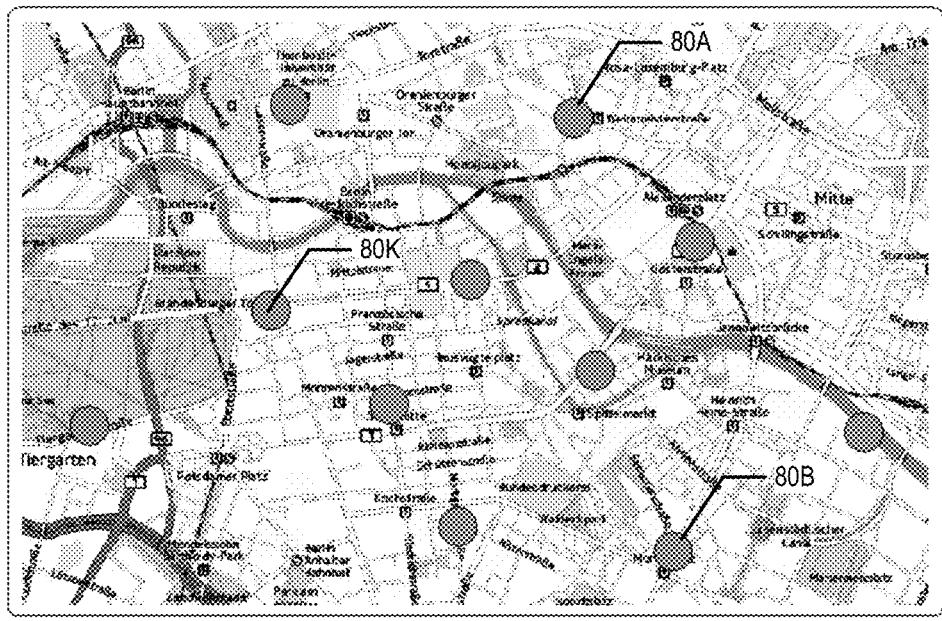
Figure 3B:
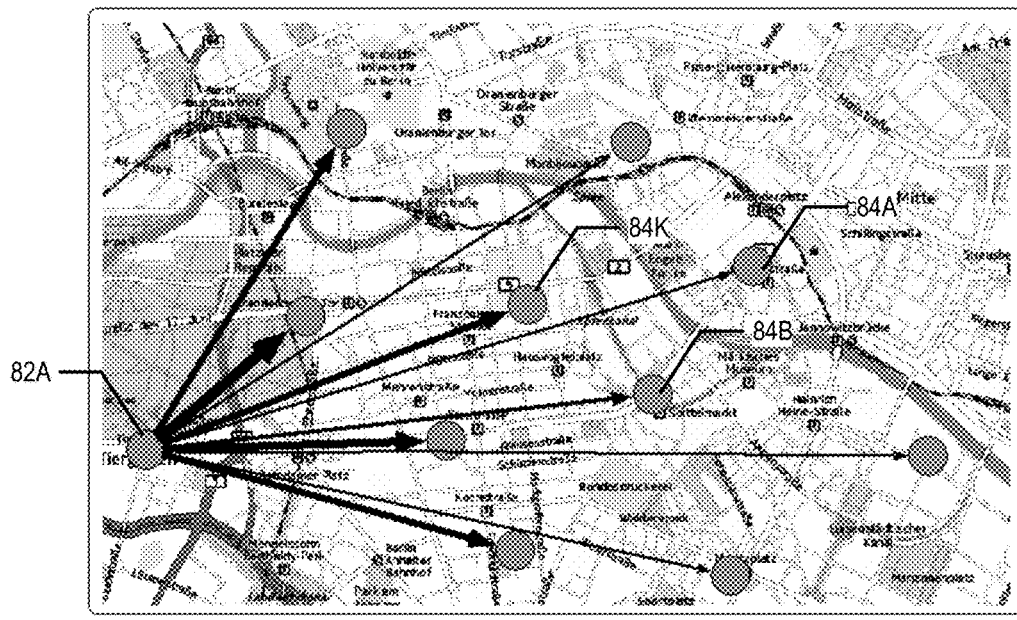
Figure 4:
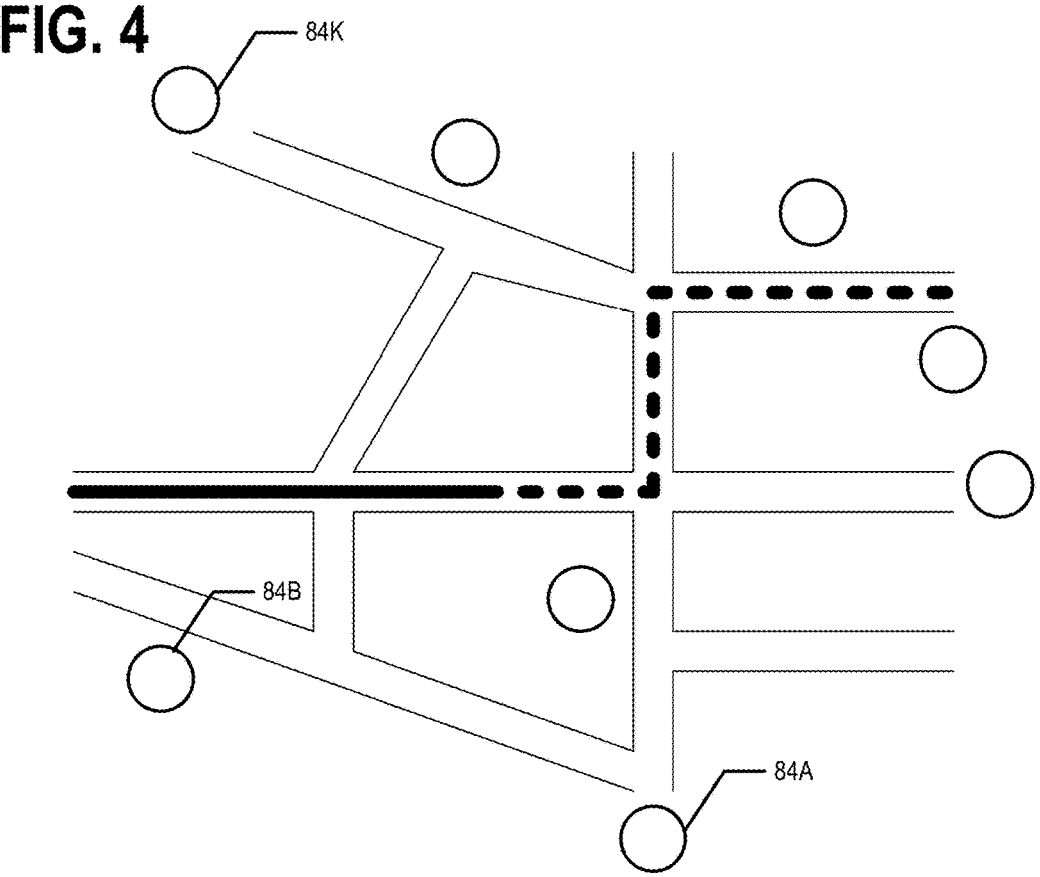
Figure 5A:
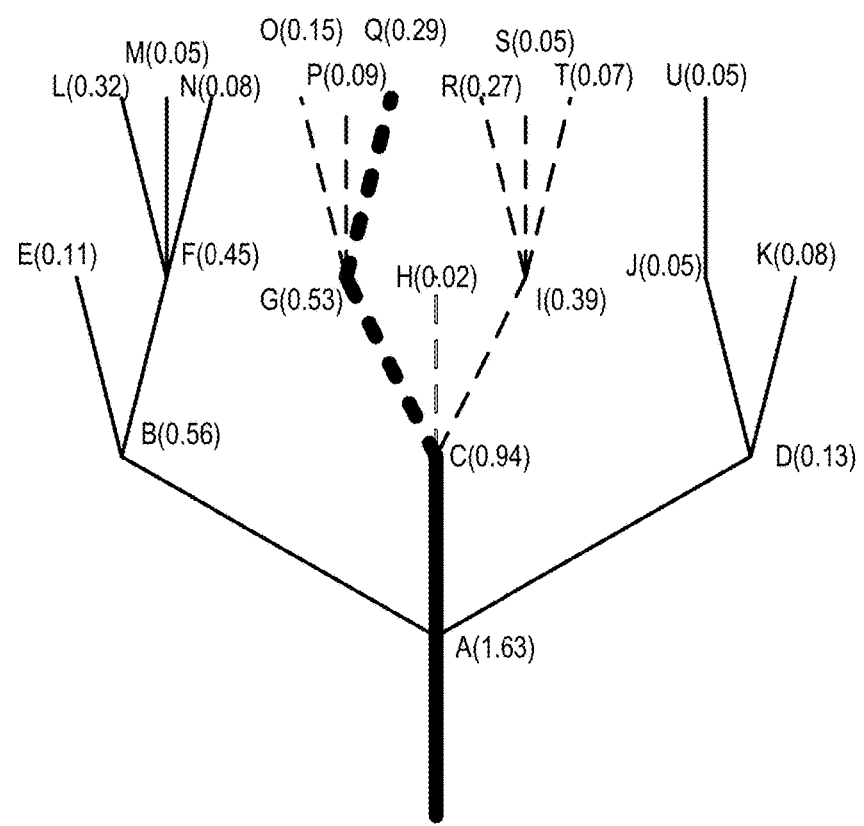
Figure 5B:
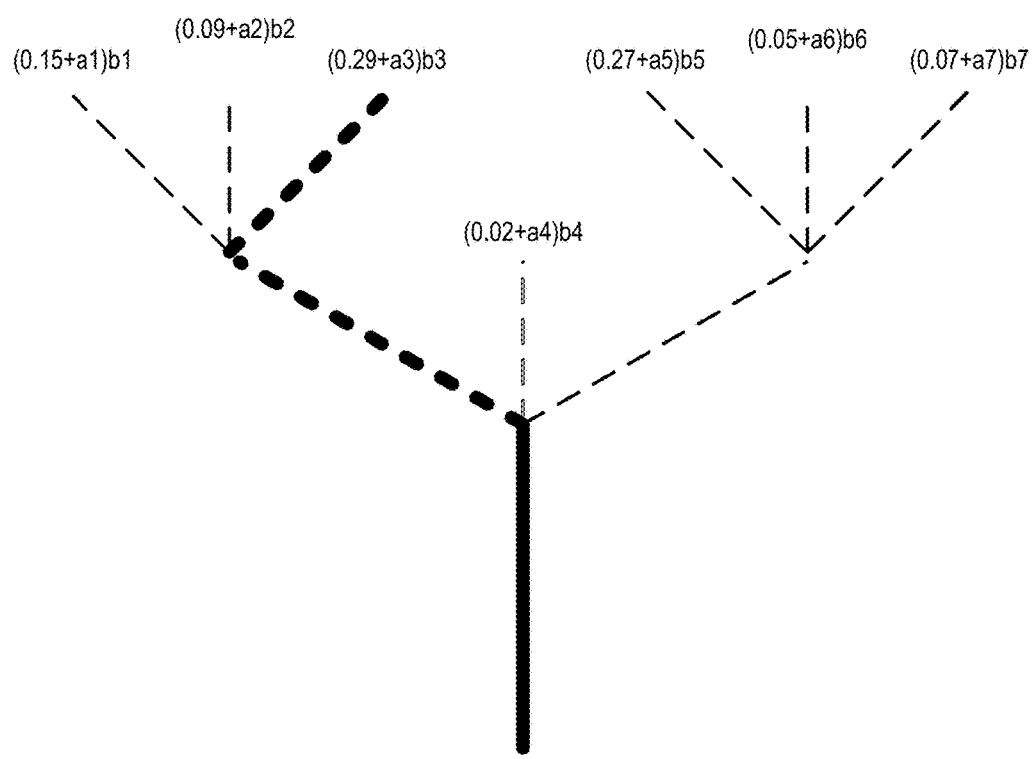
Figure 6:
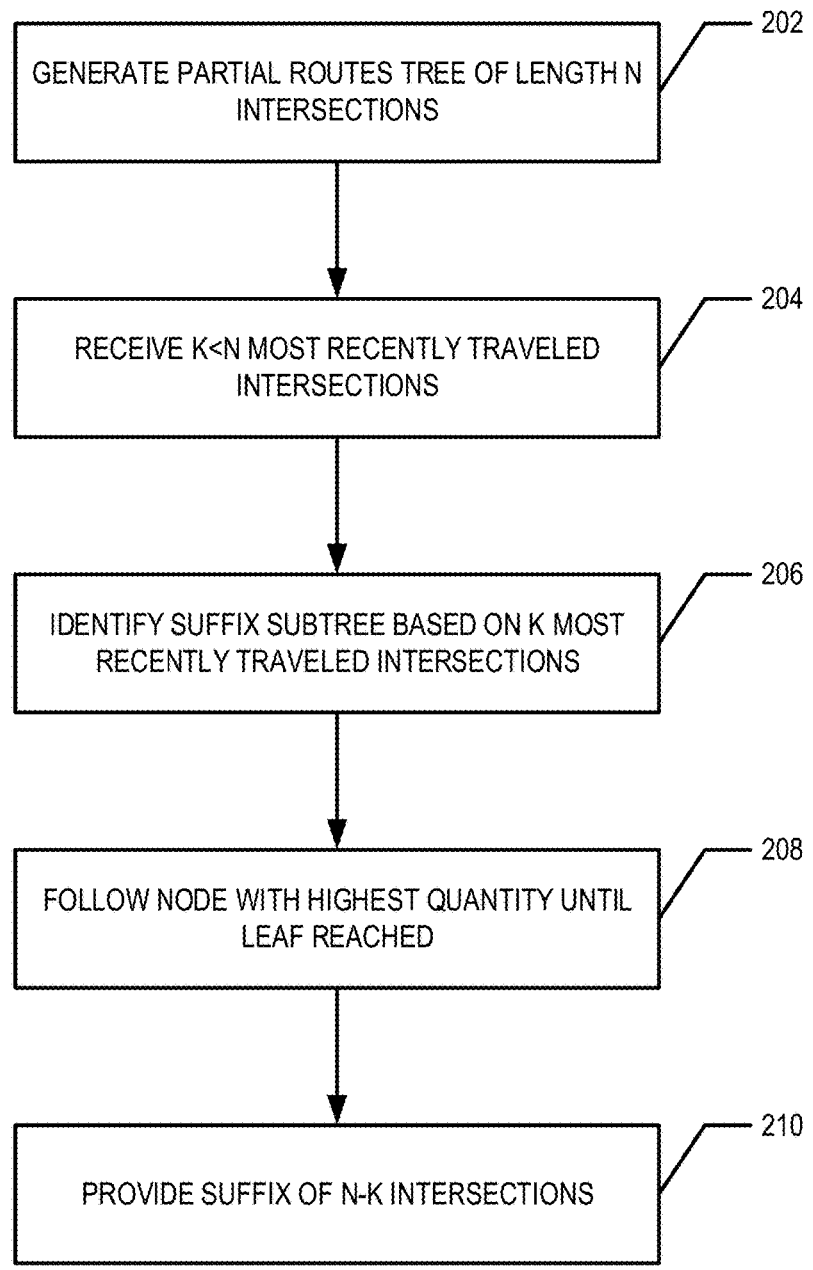
Figure 7:
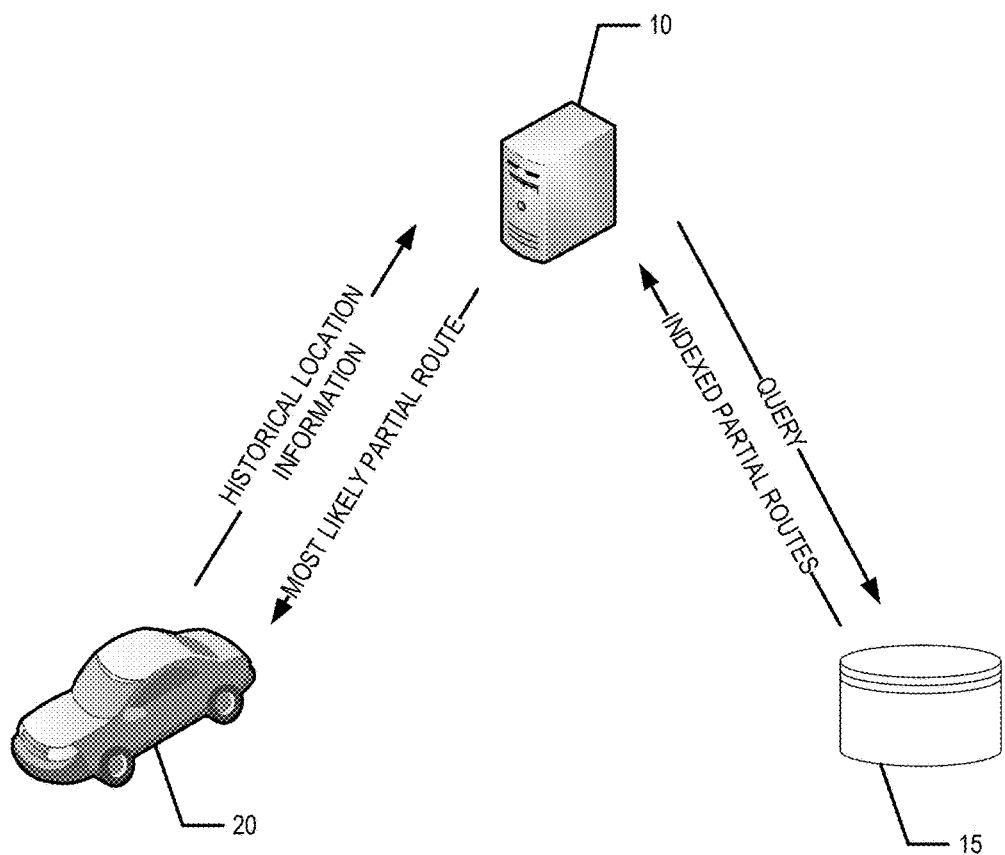
Figure 8:
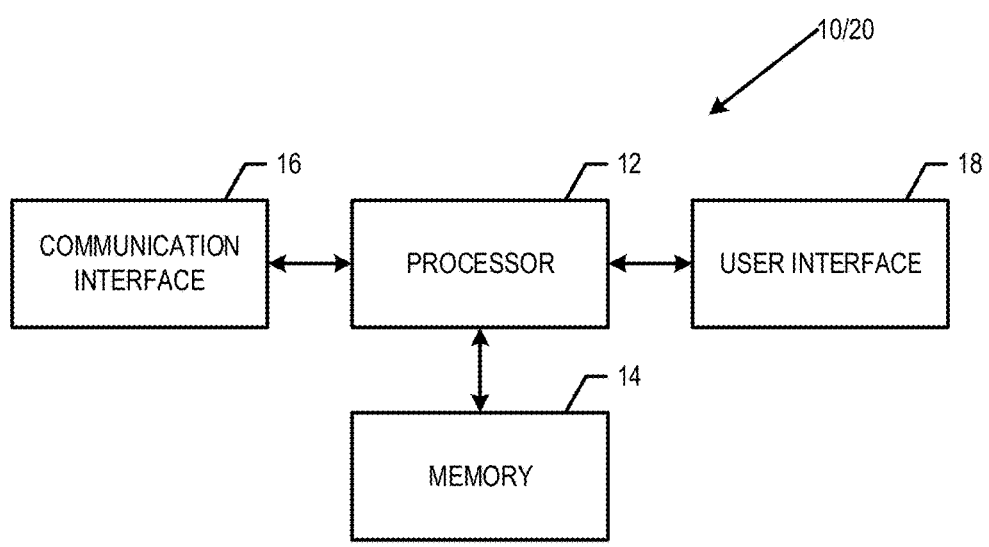

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2 is a flowchart illustrating operations performed, such as by the apparatus of FIG. 8, in order to predict the short term travel behavior of a user without knowing the user's destination, in accordance with an example embodiment;

FIG. 3A illustrates an example of some identified locations that may be an origin or destination and FIG. 3B illustrates an example of how origin-destination pairs may be built from the identified locations and assigned individual quantities, in accordance with an example embodiment;

FIG. 4 is a diagram showing historical location information and a predicted partial route for a user, in accordance with an example embodiment;

FIG. 5A is a diagram of a prefix tree of partial routes, in accordance with an example embodiment;

FIG. 5B is a diagram of a portion of a prefix tree of partial routes, in accordance with an example embodiment;

FIG. 6 is a flowchart illustrating operations performed, such as by the apparatus of FIG. 8, in order to predict the short term travel behavior of a user without knowing the user's destination, in accordance with an example embodiment;

FIG. 7 is a flow diagram showing the flow of information between various system components, in accordance with an example embodiment; and FIG. 8 is a block diagram of an apparatus that may be specifically configured in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to predict the short term travel behavior of a user based on historical location information for the user. For example, based on the last five kilometers traveled by the user or the last five intersections the user has traveled through, the next five or six kilometers or the next five or six intersections the user will travel through may be predicted. In various embodiments, an intersection may include a location where two or more roads meet and/or intersect, a highway exit/entrance, and/or the like. Based on the predicted travel path, warnings regarding upcoming hazards and traffic along the user's predicted travel path may be provided to the user. Additionally, the predicted path may be used as a "virtual probe" for traffic simulation studies.

FIG. 1 provides an illustration of an example system that can be used in conjunction with various embodiments of the present invention. As shown in FIG. 1, the system may include one or more in vehicle apparatus 20, one or more remote apparatus 10, one or more networks 50, and/or the like. In various embodiments, the vehicle may be a motor vehicle, non-motor vehicle car, scooter, truck, van bus, motorcycle, bicycle, Segway, golf cart, and/or the like. In example embodiments, a user may have an in vehicle apparatus 20 onboard his or her vehicle that may comprise components similar to those shown in the example apparatus 10 diagramed in FIG. 8. The remote apparatus 10 may be located remotely from the in vehicle apparatus 20 (e.g., the remote apparatus 10 may not be located within the vehicle).

Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), cellular network, and/or the like. For example, an in vehicle apparatus 20 may be in communication with a remote apparatus 10 via the network 50. For example, the in vehicle apparatus 20 may communicate with the remote apparatus 10 via the Cloud.

In example embodiments, the in vehicle apparatus 20 may comprise a processor, memory, a user interface, a location sensor 22 (e.g., a GPS sensor), a communications interface, and/or the like. Similarly, the remote apparatus 10 may comprise a processor 12, memory 14, a user interface 18, a communications interface 16, and/or other components configured to perform various operations, procedures, functions or the like described herein. Example embodiments of the in vehicle apparatus 20 and the remote apparatus 10 are described in more detail below with respect to FIG. 8.

In various situations, a vehicle may be driven from an actual origin to an actual destination. An in vehicle apparatus 20 may be onboard the vehicle. In various circumstances, an in vehicle apparatus 20 may be configured to receive input from a user indicating a destination and provide navigational assistance, warnings regarding upcoming hazards and/or traffic along the vehicle's travel route, and/or the like. However, if no input indicating the destination is received, it is difficult to provide warnings regarding upcoming hazards and/or traffic along the vehicle's travel route because the travel route is unknown. Embodiments of the present invention provide methods, systems, apparatus, and computer program products for predicting at least a partial travel route for the vehicle based on a portion of the travel route that the vehicle has already traversed.

II. Exemplary Operation

FIG. 2 provides a flowchart illustrating various operations and procedures that may be completed in accordance with an example embodiment of the present invention to predict a portion of a travel route of a vehicle. Starting at block 102, historical location information/data is received. For example, the in vehicle apparatus 20 may determine historical location information/data. For example, the location sensor 22 (e.g., GPS sensor) of the in vehicle apparatus 20 may determine historical location information/data for the vehicle. In various embodiments, the historical location information/data may comprise a path the vehicle recently traveled (e.g., the last n miles or kilometers the vehicle has traveled, the last n intersections the vehicle has traveled through, and/or the like). In example embodiments, the length of the path (e.g., in distance or intersections) may be configurable and/or predetermined. In an example embodiment, the historical location information/data comprises location information/data indicating the origin location from which the vehicle's current travel began (e.g., the actual origin). The in vehicle apparatus 20 may provide the historical location information/data (e.g., via a communications interface thereof). In example embodiments, the remote apparatus 10 may receive historical location information/data. For example, the remote apparatus 10 may comprise means, such as the processor 12, the communication interface 16 or the like, for receiving the historical location information/data.

At block 104, a plurality of origin-destination pairs are defined. In example embodiments, the remote apparatus 10 may define a plurality of origin-destination pairs. For example, the remote apparatus 10 may comprise means, such as the processor 12 or the like, for defining a plurality of origin-destination pairs. In some example embodiments, the actual origin is the origin for each of the origin-destination pairs. In some example embodiments, the origin of one or more origin-destination pairs may not be the actual origin. For example, in some embodiments, a set of locations may be identified from the map information/data (e.g., addresses, points of interest, and/or the like). In some embodiments, the set of locations may be identified from the geographic database, locations associated with the user or vehicle associated with the in vehicle apparatus 20 (e.g., the user's home or work address, an address the user has previously entered as a destination address, a location a user has previously visited, and/or the like), and/or the like. For example, FIG. 3A shows a map with some identified locations 80A, 80B, . . . , 80K that may be an origin or a destination. The origin-destination pairs may then be defined based on the identified locations. In some embodiments, the origin and destination of an origin-destination pair may not be the same. For example, in some embodiments, the vehicle is assumed to not be traveling in a loop. FIG. 3B shows how the probability that the vehicle is traveling from origin 82A to destination 84A, 84B, . . . , 84K may be distributed. For example, the width of the arrow in FIG. 3B may be proportional to and/or indicative of the relative probability that the vehicle is traveling from origin 82A to a destination 84A, 84B, . . . , 84K. Thus, in an example embodiment, the origin-destination pairs may include origins and/or destinations near the current location of the vehicle and origins and/or destinations located far away from the current location of the vehicle. For example, one of the origin-destination pairs may have an origin location of the New England Aquarium located in Boston, Mass. and a destination location of the Stanford University Stadium located in Stanford, Calif. Another of the origin-destination pairs may have an origin location three blocks from the current location of the vehicle and a destination location five blocks from the current location of the vehicle. Thus, a plurality of origin-destination pairs may be defined for a variety of origin locations and destination locations.

Returning to FIG. 2, at block 106, an individual quantity is assigned to each origin-destination pair. For example, the remote apparatus 10 may assign an individual quantity to each origin-destination pair. For example, the remote apparatus 10 may comprise means, such as the processor 12 or the like, for assigning an individual quantity to each origin-destination pair. In various embodiments, the individual quantity may be based on probe data. For example, in an example embodiment, the individual quantity assigned to an origin-destination pair may be based on the number of vehicles traveling from the origin to the destination. In some example embodiments, the individual quantity assigned to an origin-destination pair may not be based on probe data. For example, in various embodiments, the individual quantity assigned to an origin-destination pair may be inversely proportional to the distance between the origin and the destination. In various embodiments, the distance between the origin and the destination may be the distance of the shortest and/or fastest route between the origin and the destination, the distance directly from the origin to the destination without consideration for the road network connecting the origin and the destination (e.g., "as the crow flies"), and/or the like. In an example embodiment, the individual quantity assigned to an origin-destination pair is $1/D$, where D is the distance between the origin and the destination. In various embodiments, the individual quantity is configured to indicate a likelihood that the origin-destination pair is the actual origin-destination pair. For example, the individual quantity may be configured to indicate the likelihood that the vehicle is traveling from the origin to the destination of the origin-destination pair.

At block 108, a route from the origin to the destination is determined for each origin-destination pair. For example, the apparatus 10 may determine a route from the origin to the destination for each origin-destination pair. For example, the remote apparatus 10 may comprise means, such as the processor 12 or the like, for determining a route from the origin to the destination for each origin-destination pair. In example embodiments, for each origin-destination pair, the fastest and/or shortest route is determined. For example, the Floyd-Warshall algorithm or other appropriate algorithm may be used to determine a route (e.g., a fastest route) from the origin to the destination of one or more origin-destination pairs.

In various embodiments, the individual quantity for an origin-destination pair may be updated based on the route determined for that origin-destination pair. For example, the individual quantity may be updated to reflect the distance of the route, expected travel time of the route, and/or the like. For example, the individual quantity may be updated to be inversely proportional to the distance of the route or the expected travel time of the route. For example, the individual quantity may be updated to be $1/D'$ where $D'$ is the distance of the determined route. In an example embodiment, an individual quantity is not assigned to an origin-destination pair until the route from the origin to the destination of the origin-destination pair is determined.

At block 110, partial routes of length N may be extracted from the routes. For example, the remote apparatus 10 may extract partial routes of length N from the routes. For example, the remote apparatus 10 may comprise means, such as the processor 12, or the like, for extracting partial routes of length N from the routes. For example, one or more partial routes of length N may be extracted from the route determined for each origin-destination pair. In example embodiments, the length N of the partial routes may be configurable and/or predetermined. The length N may refer to a distance (e.g., a number of miles or kilometers) and/or a number of intersections. For example, a sliding window of length N intersections may be used to iterate through a route and extract all the partial routes of a route including N intersections. Each route determined at block 108 may be iterated through to extract partial routes of length N therefrom.

At block 112, the partial routes may be indexed. For example, the remote apparatus 10 may index the partial routes. For example the apparatus 10 may comprise means, such as the processor 12, or the like, for indexing the partial routes. In example embodiments, the partial routes are indexed into a prefix tree. For example, FIG. 4 illustrates a portion of a road network comprising a plurality of intersections and some destinations (e.g., 84A, 84B, . . . , 84K) of various origin-destination pairs. FIG. 5A illustrates a prefix tree of the partial routes that pass through the portion of the road network illustrated in FIG. 4. In FIG. 5A, the letters provide a reference for the node/leaf for easy reference herein and the number in parenthesis provides the quantity for the node/leaf. For the leaves (E, H, K, L, M, N, O, P, Q, R, S, T, and U) the quantity is the compiled quantity as described elsewhere herein. For the nodes (A, B, C, D, F, G, I, J), the quantity is the sum of the children of the node.

Each leaf in the prefix tree corresponds to one or more partial routes and is assigned a compiled quantity. For example, the remote apparatus 10 (e.g., via the processor 12 or the like) may assign a compiled quantity to each leaf of the prefix tree. In particular, the compiled quantity for a particular leaf may be the sum of the individual quantities of all of the routes that comprise the partial route indicated by the leaf. For example, a particular embodiment may use partial routes of length 4 intersections (e.g., N=4 intersections). A particular leaf of a prefix tree of this example embodiment may correspond to a left at the first intersection, a right at the second intersection and traveling forward through the third and fourth intersections. In this example embodiment, twenty routes may comprise the partial route indicated by this particular leaf. Thus, the compiled quantity assigned to this particular leaf is the sum of the individual quantities of the twenty routes comprising the partial route indicated by the particular leaf. With the historical location information/data known, the prefix tree may be easily queried and a most likely partial route may be determined by stepping along the prefix tree.

Returning to FIG. 2, at block 114, the possible partial routes are reduced based on the historical location information/data. For example, the remote apparatus 10 may reduce the possible partial routes based on the historical location information/data. For example, the remote apparatus 10 may comprise means, such as the processor 12, or the like, for reducing the possible partial routes based on the historical location information/data. For example, FIG. 4 illustrates the historical location information/data for a vehicle having an in vehicle apparatus 20 as the solid bold line. The remote apparatus 10 may receive the historical location information/data and query the prefix tree to reduce the possible partial routes the vehicle may be traveling along and to identify candidate partial routes. For example, FIG. 5A shows the historical location information/data for the vehicle as the solid bold line. Based on the historical location information/data the possible partial routes may be reduced to the candidate partial routes shown as dashed lines. The numbers located at the leaves of the prefix tree indicate the compilation quantity for the corresponding leaf. For example, if at the first intersection of the historical location information/data the vehicle traveled forward through the intersection, then the vehicle is not following a partial route comprising taking a right at the first intersection of the partial route. Therefore, any partial route indicated by the branch of the prefix tree corresponding to taking a right at the first intersection is not a candidate partial route and is not the partial route that the vehicle may be traveling along.

FIG. 5B shows a portion of the prefix tree shown in FIG. 5A. The example embodiment illustrated in FIG. 5B takes into account information/data in addition to the individual quantities of routes corresponding to the partial route to determine the compilation quantity corresponding to the partial route. For example, the compilation quantity for partial route i may take the form $(q_i+a_i)b_i$, where $q_i$ may be the sum of the individual quantities for routes corresponding to the partial route and $a_i$ and $b_i$ may be external parameters determined based on external information/data. For example, $a_i$ and $b_i$ may be based on current road conditions, current traffic conditions, traffic simulation information/data, and/or the like. For example, if it is known that a particular stretch of road is closed for, for example, road work, a water main break, a bad accident, and/or the like, the $b_i$ corresponding to any partial route that includes that stretch of road may be set to zero. For example, the probability of a user traveling along a closed road is approximately zero. Thus, in various embodiments, the compilation quantity for a partial route may depend on the sum of individual quantities for routes corresponding to the partial route and external information/data.

Continuing with FIG. 2, at block 116, the most likely partial route is identified. For example, the remote apparatus 10 may identify the most likely partial route for the vehicle. For example, the remote apparatus 10 may comprise means, such as the processor 12, or the like, for identifying the most likely partial route for the vehicle. For example, once the possible partial routes have been reduced to identify the candidate routes, the compiled quantities of the candidate partial routes may be compared to identify the most likely partial route that the vehicle is traveling along. For example, a larger compiled quantity may indicate a larger probability that the vehicle is traveling along the corresponding partial route. In an example embodiment, the candidate partial route having the largest compiled quantity assigned thereto is identified as the most likely partial route. For example, in the prefix tree illustrated in FIG. 5A and the partial road network illustrated in FIG. 4, the bold dashed line may indicate the candidate partial route identified as the most likely partial route.

In various embodiments, the remote apparatus 10 may return the identified most likely partial route to the in vehicle apparatus 20 (e.g., via the communications interface 16). The in vehicle apparatus 20 may then use the most likely partial route to provide the user (e.g., via a user interface 18) with warnings regarding upcoming hazards and/or traffic along the identified most likely partial route. In other embodiments, the identified most likely partial route may be used to provide virtual probe data for areas in which probe data coverage is insufficient for traffic simulations (e.g., areas and/or times with a low number of probes, poor GPS coverage, and/or the like).

In various embodiments, the remote apparatus 10 may execute the functions described in accordance with blocks 104, 106, 108, 110, and/or 112 before the historical location information/data is received. For example, the remote apparatus 10 may define origin-destination pairs, assign individual quantities to origin-destination pairs, determine routes from the origin to the destination of origin-destination pairs, extract partial routes from the determined routes, and/or index the partial routes before receiving historical location information/data from an in vehicle apparatus 20. The origin-destination pairs, corresponding individual quantities, routes, extracted partial routes, and/or indexed partial routes may be stored in a database (e.g., in memory 14 of the remote apparatus 10 or the like). Once the historical location information/data is received, the database may be accessed/queried to identify and reduce the possible partial routes to identify the candidate partial routes and to identify the most likely partial route from the candidate partial routes.

FIG. 6 is a flowchart showing a how prefix tree of partial routes may be used to determine a most likely partial route in an example embodiment. Starting at block 202, a partial routes tree of length N is generated. For example, the length N may refer to a number of intersections. For example, the length N may be 10 intersections. For example, the remote apparatus 10 may generate a partial routes tree of length N. For example, the remote apparatus 10 may comprise means, such as the processor 12, or the like, for generating a partial routes tree of length N. For example, the partial routes tree may be generated as described above.

At block 204, the K most recently traveled intersections is received. For example, the in vehicle apparatus may provide the K most recently traveled intersections by the vehicle and the remote apparatus 10 may receive the K most recently traveled intersections by the vehicle. For example, the remote apparatus 10 may comprise means, such as processor 12, communications interface 16, and/or the like, for receiving the K most recently traveled intersections. In various embodiments, K<N. For example, if N is 10, K may be 5, and/or the like. In the example illustrated in FIGS. 4, 5A, and 5B, the received K most recently traveled intersections are AC and provides a prefix of length 2.

At block 206 of FIG. 6, the suffix subtree is identified based on the received K most recently traveled intersections. For example, the remote apparatus 10 may receive the K most recently traveled intersections by the vehicle identify the suffix subtree based on the received K most recently traveled intersections. For example, the remote apparatus 10 may comprise means, such as processor 12, and/or the like, for identifying the suffix subtree based on the received K most recently traveled intersections. Continuing the example from above and illustrated in FIGS. 4, 5A, and 5B, the suffix subtree comprises G, H, I, O, P, Q, R, S, T. Thus, the candidate partial routes are therefore those having the prefix identified by the K most recently traveled intersections. The suffix subtree comprises the portions of the candidate routes that are not constrained by the received K most recently traveled intersections.

Continuing with FIG. 6, at block 208, the node with the highest quantity is followed until a leaf is reached. For example the remote apparatus 10 may follow the node with the highest quantity until a leaf is reached. For example, the remote apparatus 10 may comprise means, such as processor 12, and/or the like, for following the node with the highest quantity until a leaf is reached. For example, continuing the example shown in FIGS. 4, 5A, and 5B, given the prefix AC, G is the node of the next level having the highest quantity, so the solution suffix begins with G. From node G, the leaf Q has the highest compiled quantity. Thus, the solution suffix is GQ and the most likely partial route is ACGQ. Thus, the node with the highest quantity is followed to extract the most likely suffix and identify the most likely partial route from the candidate partial routes. In general the suffix will be of length N−K. For example, in the example described in detail herein, N is 4, and K is 2. Thus, in this example, the suffix has a length of 2 intersections.

Returning to FIG. 6, at block 210, the suffix of length N−K is provided, for example, to the in vehicle apparatus 20. For example, the remote apparatus 10 may provide, transmit, and/or the like the suffix of length N−K. For example, the remote apparatus 10 may comprise means, such as processor 12, communications interface 16, and/or the like, for providing, transmitting and/or the like the suffix of length N−K. The in vehicle apparatus 20 may receive the suffix identifying the most likely next N−K intersections the vehicle will travel through and provide alerts and/or the like to the user based thereon.

FIG. 7 illustrates an information flow for an example embodiment of the present invention. In the illustrated example information flow, the in vehicle apparatus 20 provides historical location information to the remote apparatus 10. For example, the in vehicle apparatus 20 may leverage the location sensor 22, a processor 12, a communications interface 16, and/or the like to provide historical location information. The remote apparatus 10 may receive the historical location information via a communications interface 16. The remote apparatus 10 may then processes the historical location information via a processor 12 and query a database 15 comprising indexed partial routes. In various embodiments, the database 15 may be stored in a memory 14 of the remote apparatus 10. The remote apparatus 10 (e.g., via processor 12) may receive the indexed partial routes corresponding to the current location of the vehicle, the first intersection identified in the historical location information, and/or the like as appropriate for the structure of the query. The remote apparatus 10 (e.g., via the processor 12) may then reduce the possible partial routes to the candidate partial routes based on the historical location information and identify and/or determine the most likely partial route of the candidate partial routes based on the compiled quantities associated with the candidate partial routes. The remote apparatus 10 may then provide the most likely partial route to the in vehicle apparatus 20.

In various embodiments, the remote apparatus 10 may merely provide the response to the query to the in vehicle apparatus 20 and the in vehicle apparatus 20 may reduce the possible partial routes to the candidate partial routes based on the historical location information and identify and/or determine the most likely partial route of the candidate partial routes based on the compiled quantities associated with the candidate partial routes. In various embodiments, the in vehicle apparatus 20 may query the database 15 directly.

In various embodiments, instead of and/or in addition to providing a partial route, the in vehicle apparatus 20 and/or the remote apparatus 10 may identify, based on the identified most likely route, what path the vehicle is most likely to take through the next intersection. For example, a vehicle may be traveling along the highway and the probability that the vehicle will continue to drive along the highway or take the next exit may be determined based on the most likely partial route that the vehicle is traveling along. If the probability is high that the vehicle will continue to travel along the highway, warnings related to the traffic and/or hazards on the highway may be provided to the user. If the probability is high that the vehicle will exit the highway, warnings related to the traffic and/or hazards on one or more surface streets near the upcoming highway exit may be provided to the user.

III. Example Apparatus

The in vehicle apparatus 20 and/or remote apparatus 10 of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the apparatus may be embodied in other types of computing devices, such as a server, a personal computer, a computer workstation, a laptop computer, a plurality of networked computing devices or the like, that are configured to analyze probe points for route planning or other purposes. In this regard, FIG. 8 depicts an apparatus (e.g., a remote apparatus 10 or an in vehicle apparatus 20) of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the remote apparatus 10 and/or in vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10 and/or in vehicle apparatus 20 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The remote apparatus 10 and/or the in vehicle apparatus 20 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10 and/or in vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIG. 1 illustrates a flowchart of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for identifying a most likely partial route for a vehicle, the method comprising:
    receiving, by an apparatus remotely located with respect to the vehicle and comprising a processor, a memory, and a communication interface configured to communicate via at least one network, historical location information for the vehicle, the historical location information provided by a vehicle apparatus onboard the vehicle, wherein (a) the vehicle apparatus comprises a location sensor, (b) at least a portion of the historical location information was generated by the location sensor, (c) the historical location information indicates a path traveled by the vehicle during the vehicle's current travel, and (d) the path comprises a current location of the vehicle;
    querying, by the apparatus, a set of indexed partial routes based at least in part on at least a portion of the path indicated by the historical information, a partial route of the set of indexed partial routes having a compiled quantity assigned thereto;
    reducing, by the apparatus, the set of indexed partial routes to a set of candidate partial routes based at least in part on the path indicated by the historical location information; and
    identifying, by the apparatus, a most likely partial route along which the vehicle is currently traveling from the set of candidate partial routes based at least in part on the compiled quantity associated with each of the candidate partial routes.

2. A method according to claim 1 wherein the set of indexed partial routes is built by at least:
    identifying a plurality of origin-destination pairs;
    assigning an individual quantity to an origin-destination pair of the plurality of origin-destination pairs;
    determining a set of routes, each route of the set of routes being a route from an origin to a destination of one of the plurality of origin-destination pairs;
    extracting a set of partial routes of a length N from the set of routes; and
    assigning the compiled quantity to a partial route of the set of partial routes based at least in part on the individual quantity assigned to one of the plurality of origin-destination pairs, wherein the route from the origin to the destination of the origin-destination pair comprises the partial route.

3. A method according to claim 2 wherein the individual quantity is not based on probe data.

4. A method according to claim 2 wherein the individual quantity assigned to an origin-destination pair is inversely correlated to the distance between the origin and the destination.

5. A method according to claim 2 wherein the compiled quantity for the partial route is the sum of the individual quantities assigned to each origin-destination pair for which the route from the origin to the destination comprises the partial route.

6. A method according to claim 2 wherein the length N is a predetermined distance or N intersections.

7. A method according to claim 2 wherein the individual quantity indicates the probability that the user is traveling from the corresponding origin to the corresponding destination and wherein the compiled quantity indicates the probability that user is traveling along the partial route.

8. A method according to claim 2 wherein the route corresponding to an origin-destination pair is the shortest route from the origin to the destination, the fastest route from the origin to the destination, or both.

9. A method according to claim 1 wherein the historical location information is determined by a location sensor onboard the vehicle and indicates the current location of the vehicle and at least a partial travel path of the vehicle to get to the current location.

10. A method according to claim 9 wherein the travel path comprises a path the vehicle has traveled for predetermined distance, information regarding the past n intersections the vehicle has traveled through, or both.

11. A method according to claim 1 wherein the compiled quantity assigned to at least one partial route is determined based at least in part on external information.

12. A method according to claim 11 wherein the external information is based at least in part on current traffic conditions, current road conditions, traffic simulations, or a combination thereof.

13. An apparatus comprising at least one processor, a communication interface configured for communicating via at least one network, and at least one memory storing computer program code, the at least one memory and the computer program code configured to, with the processor, cause the apparatus to at least:
    receive, via the communication interface, historical location information for the vehicle, the historical location information provided by a vehicle apparatus onboard the vehicle, wherein (a) the vehicle apparatus comprises a location sensor, (b) at least a portion of the historical location information was generated by the location sensor, (c) the historical location information indicates a path traveled by the vehicle during the vehicle's current travel, and (d) the path comprises a current location of the vehicle;
    query a set of indexed partial routes based at least in part on at least a portion of the path indicated by the historical information, a partial route of the set of indexed partial routes having a compiled quantity assigned thereto;
    reduce the set of indexed partial routes to a set of candidate partial routes based at least in part on the path indicated by the historical location information; and
    identify a most likely partial route along which the vehicle is currently traveling from the set of candidate partial routes based at least in part on the compiled quantity associated with each of the candidate partial routes.

14. An apparatus according to claim 13 wherein to build the set of indexed partial routes the at least one memory and the computer program code are further configured to, with the processor, cause the apparatus to at least:

identify a plurality of origin-destination pairs;

assign an individual quantity to an origin-destination pair of the plurality of origin-destination pairs;

determine a set of routes, each route of the set of routes being a route from an origin to a destination of one of the plurality of origin-destination pairs;

extract a set of partial routes of a length N from the set of routes; and assign the compiled quantity to a partial route of the set of partial routes based at least in part on the individual quantity assigned to one of the plurality of origin-destination pairs, wherein the route from the origin to the destination of the origin-destination pair comprises the partial route.

15. An apparatus according to claim 14 wherein the individual quantity assigned to an origin-destination pair is inversely correlated to the distance between the origin and the destination.

16. An apparatus according to claim 14 wherein the compiled quantity for the partial route is the sum of the individual quantities assigned to each origin-destination pair for which the route from the origin to the destination comprises the partial route.

17. An apparatus according to claim 14 wherein the individual quantity indicates the probability that the user is traveling from the corresponding origin to the corresponding destination and wherein the compiled quantity indicates the probability that user is traveling along the partial route.

18. An apparatus according to claim 14 wherein the route corresponding to an origin-destination pair is the shortest route from the origin to the destination, the fastest route from the origin to the destination, or both.

19. An apparatus according to claim 13 wherein the historical location information is determined by a location sensor onboard the vehicle and indicates the current location of the vehicle and at least a partial travel path of the vehicle to get to the current location and wherein the travel path comprises a path the vehicle has traveled for predetermined distance, information regarding the past n intersections the vehicle has traveled through, or both.

20. A computer program product comprising at least one non-transitory computer-readable storage medium having computer-executable program code instructions stored therein, the computer-executable program code instructions comprising program code instructions configured to:

receive historical location information for the vehicle, the historical location information provided by a vehicle apparatus onboard the vehicle, wherein (a) the vehicle apparatus comprises a location sensor, (b) at least a portion of the historical location information was generated by the location sensor, (c) the historical location information indicates a path traveled by the vehicle during the vehicle's current travel, and (d) the path comprises a current location of the vehicle;

query a set of indexed partial routes based at least in part on at least a portion of the path indicated by the historical information, a partial route of the set of indexed partial routes having a compiled quantity assigned thereto;

reduce the set of indexed partial routes to a set of candidate partial routes based at least in part on the path indicated by the historical location information; and identify a most likely partial route along which the vehicle is currently traveling from the set of candidate partial routes based at least in part on the compiled quantity associated with each of the candidate partial routes.

* * * * *